United States Patent

[11] 3,602,093

| [72] | Inventors | Peter Fischer<br>50 Bundtacherstr., 8127, Forch;<br>Adolf Klausberger, Kronenstr. 489,<br>Dielsdorf/Zurich; Wilhelm Maurer,<br>Wehntalerstr. 536, 8046, Zurich, all of,<br>Switzerland |
|---|---|---|
| [21] | Appl. No. | 743,477 |
| [22] | Filed | July 9, 1968 |
| [45] | Patented | Aug. 31, 1971 |
| [32] | Priority | July 1, 1968, July 12, 1967 |
| [33] | | Switzerland |
| [31] | | 9827/68 and 009938/67 |

[54] APPARATUS AND METHOD FOR MACHINING METAL BLANKS
5 Claims, 2 Drawing Figs.

[52] U.S. Cl. .................................................. 90/15,
90/15.1 R, 82/2.5, 90/11 C
[51] Int. Cl. .................................................. B23c 3/04
[50] Field of Search ..................................... 90/11, 15,
11.3, 15.1; 82/2.5, 2.7, 8; 51/125.5

[56] References Cited
UNITED STATES PATENTS

| 1,520,219 | 12/1924 | Barnes | 90/15 |
| 2,629,292 | 2/1953 | McCullough | 90/11 X |
| 2,674,161 | 4/1954 | Swire | 90/15 |
| 2,674,926 | 4/1954 | Kralowetz | 90/15 |
| 3,295,414 | 1/1967 | Szwadowski | 90/11 |
| 3,322,037 | 5/1967 | Cavagnero | 90/11 |
| 3,286,324 | 6/1926 | Hautau | 82/2.5 X |

FOREIGN PATENTS

| 655,316 | 7/1951 | Great Britain | 90/15 |

Primary Examiner—Gil Weidenfeld
Attorney—Kurt Kelman

ABSTRACT: A tubular or cylindrical metal blank is rotated and supported between a headstock and a tailstock while the lateral surface of the blank is milled by a rotary milling unit which is slidable in parallel to the axis of the blank. The axis of rotation of the milling unit is at right angles to the blank axis and may be raised or lowered relative thereto. Upon its release from the headstock and tailstock, the blank may be supported by holding means which are adjustable to bring the blank axis into parallelism with the milling unit axis, so that both ends of the blank may be milled.

INVENTORS.
PETER FISCHER
ADOLF KLAUSBERGER
BY WILHELM MAURER
Kurt Kelman
AGENT

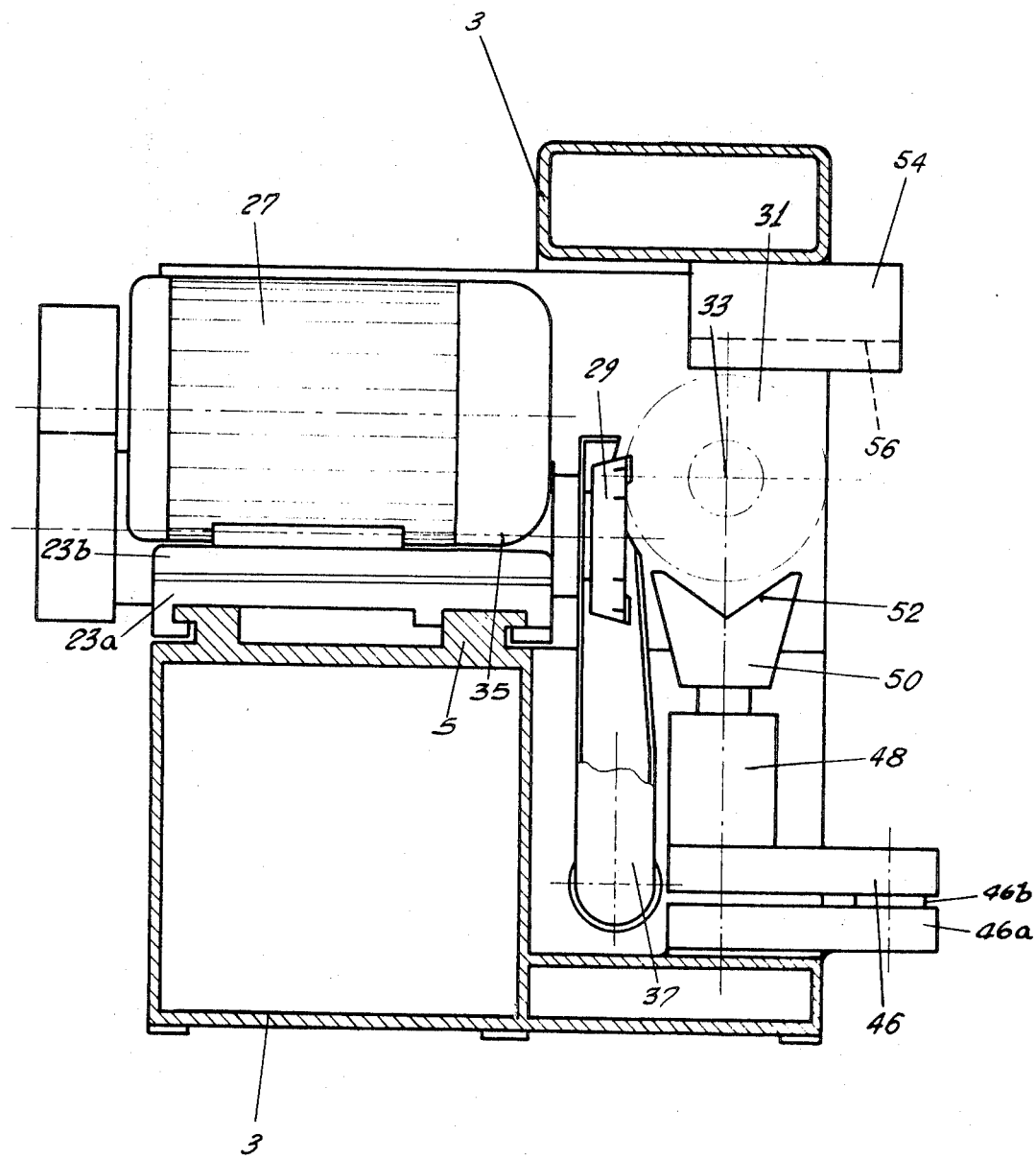
Fig. II.

APPARATUS AND METHOD FOR MACHINING METAL BLANKS

The present invention relates to a process for the machining of metal workpieces, in particular blanks, and to a turning machine for the performance of such process.

In the metal industry, it is in many cases necessary to work over the rough castings before further machining, as, for instance, to remove the casting scale, which may be porous or contain oxide and other inclusions. Such working-over is also necessary when the surface finish of the rough casting is unsuitable for further machining, as when the blank has undergone roughing, punching or sawing.

A known method of treating such workpieces is to use a turning machine and fix the blank by means of mandrels with a view to turning the work surface. If the blank is not centered by special means, it may run out of true and thus, during the cutting process, set up vibrations in the machine which make it impossible to obtain an even finish and which also put such a strain on the machine bearings that the machining accuracy rapidly declines. For this reason, the speeds applied today for such blanks are so low that the cutting rates are far below the optimum for the particular material, and this naturally involves economic drawbacks. Another result of the vibrations is the short edge-life of the cutting tool. These considerations apply particularly to blanks presenting flaws of shape, such as bent or eccentric bars.

The object of the present invention is to obviate these disadvantages. The process claimed hereunder is characterized by the fact that the rotating blank is milled.

The turning machine for the performance of the process claimed hereunder is characterized by means whereby it is possible to rotate the blank or the tool about the long axis of the blank concurrently, separately or in combination, to mill the blank on its surface, and to displace the place or places of milling along the long axis of the blank and/or across such axis.

The said invention is now illustrated by way of example by reference to an embodiment shown in the drawing, wherein:

FIG. 2 shows a section through the turning machine shown in FIG. 1, along the line II—II in FIG. 1.

Figure 1:
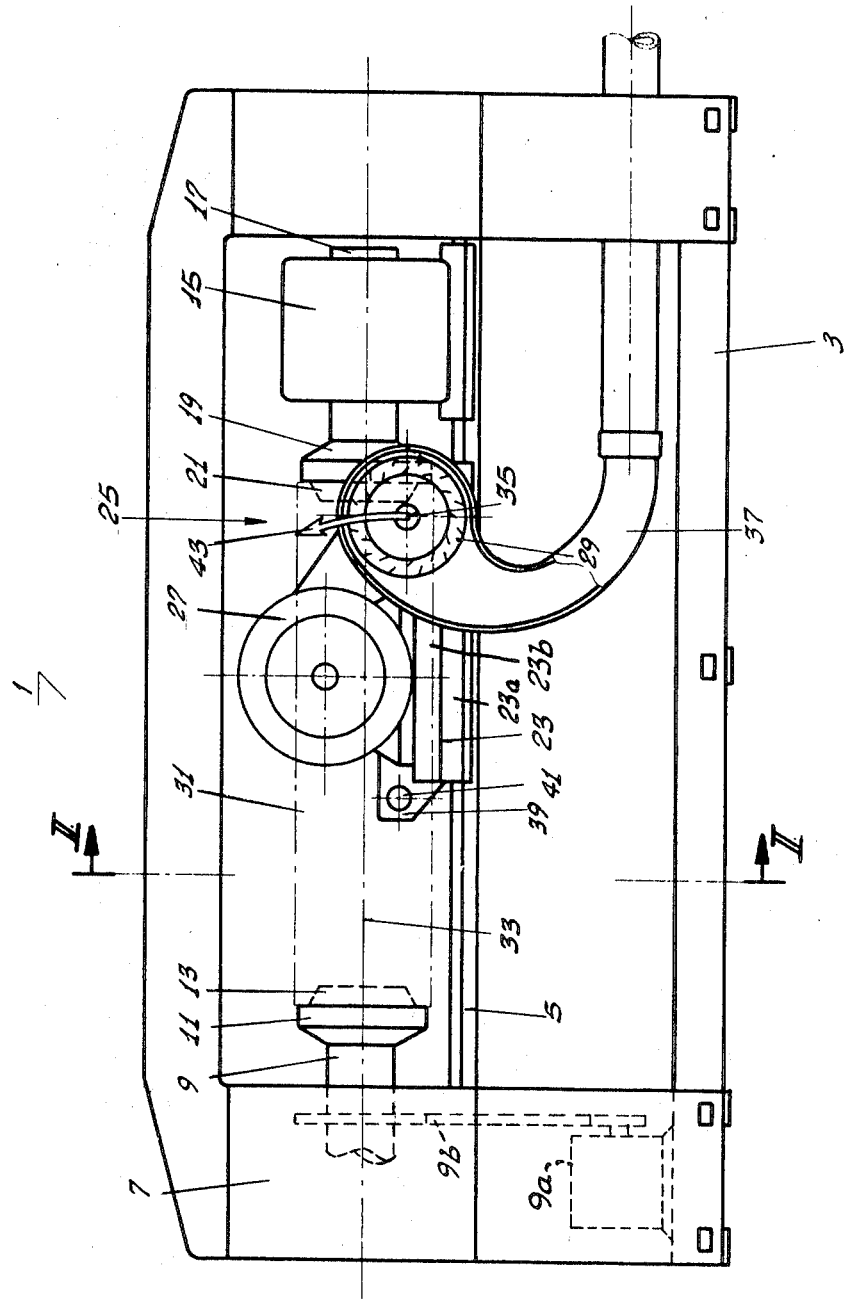
FIG. 1 shows a front view of a turning machine with milling unit, excluding the lifting and swiveling prism and the backup prism.

FIGS. 1 and 2 show in greatly simplified manner a turning machine 1 with a frame 3 and a slide guide 5. Located at one end of the slide guide 5 is a headstock 7 with a spindle 9, at whose free end a faceplate 11 with a holding taper 13 for holding tubes is arranged. The spindle 9 is rotated in any suitable conventional manner, as by a motor 9a and a drive connection 9b. Located at the other end of the slide guide 5 is a slidable tailstock 15 with a mechanically, hydraulically, pneumatically or electrically operable fixing device in the form of a slidable spindle 17, which has a faceplate 19 with a holding taper 21 arranged at its end facing the blank. A slide 23 slidably arranged on the slide guide 5 carries a milling unit 25 with a driving motor 27 and a mill 29. A blank 31 to be machined is held between the faceplates 11 and 19 by means of the holding tapers 13 and 21 and can, driven by spindle 9, rotate about its longitudinal axis 33. The rotational axis 35 of the mill 29 is perpendicular to the longitudinal axis of the blank 31. A chip suction unit 37 serves to draw off the milling chips. The slide 23 includes a lower portion 23a which is slidable along the guide 5 and an upper portion 23b which carries the milling unit 25, the two slide portions being connected together by hinge means 39 including a horizontal hinge pin 41, so that the upper slide portion may be pivotally moved about the pin 41 in a vertical plane as indicated by the arrow 43, whereby to raise or lower the rotational axis 35 of the mill 29 with respect to the axis 33 of the blank 31. A fixed bracket 46a at the front of the machine is provided with a vertical pivot pin 46b carrying a horizontally swingable support 46. A vertically adjustable cylinder 48 on the support 46 carries a swiveling prism or work holder 50 having a grooved surface 52 which may be engaged with the underside of the blank 31 when the holder 50 is raised by the cylinder 48. Then, upon releasing of the blank from the headstock 7 and tailstock 15, the blank supported by the holder 50 may be translated in a horizontal plane by swinging movement of the support 46 about the pivot pin 46b so that the longitudinal axis of the blank is turned horizontally through 90 degrees and becomes parallel to the rotational axis 35 of the mill 29. In this translated position the blank is raised by the cylinder 48 so that the upper portion of the blank comes in contact with a grooved surface 56 of a fixed upper prism or work holder 54 at the front of the machine, thus clamping the blank between the two work holders 50, 54. The blank 31 is initially placed between the two faceplates 11 and 19 by a feeder (not shown) and, if it is a solid blank, clamped between the said two faceplates. If the blank 31 is a tube, the appropriate removable holding tapers 13 and 21 are fixed to the faceplates 11 and 19 and thus serve to center and fasten tubular blanks. For the purpose of increasing adhesion between the holders and the blank 31, the holders can be jacketed with a special material or provided with a better grip by giving them an appropriate surface finish. The axial fixing pressure required can be preselected, after which fixing can be effected automatically by means of the fixing device 17. The setting of the mill 29 or the milling unit 25 on the slide 23 is made in such a way that with a single pass of the mill 29 the whole lateral surface of the blank 31 is machined. By coupling (not shown) the drive of the spindle 9 in the headstock 7 with the slide 23 and the milling unit 25, it is possible to set the feed of the mill 29 in the direction of the long axis 33 of the blank 31 according to the particular requirements. Irrespective of the drive of the blank 31, the mill 29 is set rotating by the motor 27 and then the blank 31 is given a slow rotating motion. As mentioned, the feed drive of the mill 29 is capable of being coupled (not shown) with the drive of spindle 9. The mill 29 runs with optimum cutting speed and is moved along the slowly rotating blank 31. The speed of the blank normally ranges from 0.5 to 10 r/m and depends on the material and in particular on the shape and surface character of the blank, notably on the regularity of the blank in respect of mass distribution about the long axis 33. If the imbalance to be expected is slight, the speed can be increased, as up to 30 r/m and over. For blanks with flaws of shape and correspondingly varying milling depth, it is good practice to control the headstock drive for constant power intake of the mill motor 27. As the feed of the slide 23 can also be coupled with the headstock drive, constant power intake of the mill motor 27 can be achieved by corresponding adjustment of the speed of the blank 31 and the associated feed of the slide 23.

The facility of raising or lowering the mill axis 35 relative to the blank axis 33 permits this axis 35 and the axis 33 of the blank to be made to intersect in a common plane. Thus, in milling, it is possible to mill a neat radial shoulder with the tangential cutting edges, as in the case of offset-forged shafts.

Instead of pivotally swinging the upper slide portion 23b about the hinge pin 41 to effect raising or lowering of the mill 29, the slide portion 23b may be arranged so as to be vertically slidable on the slide portion 23a. In addition to milling the lateral surface of the blank, it is to mill the blank 31 on the end faces. For this, the prism 50 is raised until it serves as a support for the blank 31. After slackening of the faceplates 11 and 19, the prism 50 is horizontally with the blank 31 through 90 degrees and then raised until the blank is clamped between the two prisms 50 and 54, i.e. between surfaces 52 and 56. Then, after setting-up, the first end face of the blank 31 can be machined. After lowering of prism 50, the blank horizontally through 180 degrees, raising and clamping of blank 31, the other face can be machined. The supporting cylinder 48 with the prism 50 may be designed as a hydraulic jack and clamp. This machining of the end faces leaves no clamping marks on the blank 31.

The high cutting rates of several thousand meters a minute attainable notably with light alloys (the lower limit probably being around 100 meters/min.) result, with a suitable power of the milling unit 25, in low cutting pressures and therefore in small reactive forces on the blank 31, so that the clamping of the latter between faceplates 11 and 19 is sufficient, which would not be so if the blank 31 were machined by turning. In a lathe, a relatively very high clamping force is required, as the high speeds may result in very large forces of imbalance. The construction of the machine must therefore be correspondingly heavy. In the turning and milling machine described above, the clamping force between the faceplates need only take up the cutting pressures, which, owing to the very high mill speeds, are low.

Thus, while an aluminum bar of 500 mm. diameter, for instance, must be turned with a speed of about 250 r/m (corresponding to a cutting rate of 390 meters/min.), with the combination machine described above this work can be done with cutting rates which are practically only limited by the edge quality of the mill and which may be as high as 4,000 meters/min. and over.

The combination machine described is especially suitable for cutting aluminum and other nonferrous metals and their alloys, and also grey iron and in some cases steel. With this machine it is readily possible to remove as much as ten times more metal volume per unit time than is feasible with the known conventional turning machines.

A further advantage of the invention is that the machining process results in short and uniform chips which are suitable for automatic removal, as by blowers, in contrast to lathe-produced chips, which, besides bulking, have to be chopped up. Compared with its power, the machine claimed hereunder is of lightweight construction, as, in contrast to the lathe, the full drive power need not be transferred to the blank through the headstock drive, nor is any step gearing required to adjust the cutting speeds to the blank diameters, as the mill only runs at a preset fixed speed which is independent of the blank diameter. Thus, the blank drive need practically only provide the feed power, and this is in itself slight. Again the conditions regarding speedup and braking of the blank are far more favorable in the machine claimed hereunder than they are in lathes, in which the blank has to be speeded up to levels between 100 and 2,000 r/m and then slowed down again. In the present case, the blank speeds range from about 0.5 to 10 r/m, as mentioned. Also, tool edge life and specific chip-removing rates are better with the machine claimed hereunder, as a mill normally has 40 to 50 cutting edges, compared with one to four in lathe tools, so that, with chip volumes the same, the edge life of the mill is basically 10 to 50 times longer.

The surface finish obtained by the process described is extremely even, with a roughness of the order of 1–5 microns, which is unattainable with a lathe machining such crude and unbalanced blanks. Moreover, the performance limit of the lathe with the known chip-removing method is determined by the blank speed and the imbalance of the blank and can hardly be exceeded. With the machine claimed hereunder, the limit attainable is only determined by the edge quality of the milling tool, as it is readily possible to increase the speed of the milling spindle, to which there are no definite limits. With the use of oxide-ceramic cutting edges, the capacity is today increasing almost indefinitely.

Summing up, it may be said that the present invention, compared with the known machining processes with the usual turning machines, can remove far greater chip volumes per unit time, results in considerably longer tool edge life (which is important for automated operation), is practically independent of the shape of the blank, and ensures a very fine finish. It is thus possible not only to machine round blanks, but also to machine blanks of any cross section for which the feed must be controlled in intermittent fashion, which is readily feasible by means of punched cards, for instance. Also, the feed rate can be so controlled as to obtain the optimum chip volume in each particular case. This type of control is impossible in a turning machine of the conventional type. Indeed, with such turning machines it may well be necessary in the machining of distorted blanks to proceed in several operations, as the tool is at times out of engagement with the work.

We claim:

1. In an apparatus for machining cylindrical or tubular blanks, the combination of a machine frame, means on said frame for supporting a cylindrical or tubular blank and rotating the blank about its longitudinal axis, a milling unit slidable on said frame in parallel to the blank axis, said milling unit including a rotary mill having its axis of rotation disposed at 90° to the blank axis whereby the lateral surface of the blank may be milled by the rotary mill while the blank is rotated and the milling unit is slid on said frame, said blank supporting and rotating means comprising a headstock and a tailstock on said frame, together with additional means for supporting and translating the blank from its position between the headstock and tailstock to a position where the longitudinal axis of the blank is parallel to the axis of rotation of said mill for engagement of the ends of the blank by said mill.

2. The apparatus as defined in claim 1 wherein said blank supporting and translating means are vertically adjustable on said frame.

3. The apparatus as defined in claim 1 wherein said blank supporting and translating means are translatable on said frame in a plane parallel to the blank axis.

4. A method of machining cylindrical or tubular metal blanks, comprising the steps of (a) supporting and rotating the blank about its longitudinal axis, (b) engaging the lateral surface of the blank by a rotary mill which has its axis of rotation at right angles to the blank axis, (c) moving the rotary mill in a direction parallel to the longitudinal axis of the blank, (d) supporting and translating the blank to a position wherein its longitudinal axis is parallel to the axis of rotation of said mill, and (e) engaging the end surfaces of the blank by said mill.

5. In an apparatus for machining the lateral surface and the end surfaces of a cylindrical or tubular blank of metal, the combination of a machine frame, a milling unit slidably mounted on said frame and including a rotary mill rotatable in a plane parallel to the sliding movement of said unit, a headstock and a tailstock provided on the frame for supporting and rotating a cylindrical or tubular blank with its axis parallel to the sliding movement of said milling unit whereby the lateral surface of the blank may be machined by said mill while the latter is rotated and the milling unit is slid on the frame, and an adjustable support means provided on said frame for supporting and translating the blank from its position between the headstock and tailstock to a position where the blank axis is normal to the plane of rotation of said mill whereby the ends of the blank may be machined by the mill while the blank is held by said adjustable support means.